United States Patent
Morikawa et al.

(10) Patent No.: US 6,848,047 B1
(45) Date of Patent: Jan. 25, 2005

(54) SECURITY MANAGING SYSTEM, DATA DISTRIBUTION APPARATUS AND PORTABLE TERMINAL APPARATUS

(75) Inventors: Shigenori Morikawa, Kokubunji (JP); Toshiyuki Iguchi, Tokyo (JP); Motoi Otsuka, Tachikawa (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/557,980

(22) Filed: Apr. 25, 2000

(30) Foreign Application Priority Data

Apr. 28, 1999 (JP) .......................... 11-121200
Sep. 21, 1999 (JP) .......................... 11-266853

(51) Int. Cl.[7] .......................... G06F 12/14; H04L 9/12
(52) U.S. Cl. .......................... 713/159; 711/111; 711/112; 713/172; 713/175
(58) Field of Search .......................... 715/172, 185; 235/380; 711/111, 112, 115, 164; 713/159, 185, 193, 172

(56) References Cited

U.S. PATENT DOCUMENTS

| | | | | |
|---|---|---|---|---|
| 3,956,615 A | * | 5/1976 | Anderson et al. | 705/72 |
| 5,040,084 A | * | 8/1991 | Liu | 360/77.04 |
| 5,225,664 A | * | 7/1993 | Iijima | 235/380 |
| 5,509,073 A | * | 4/1996 | Monnin | 380/229 |
| 5,544,246 A | * | 8/1996 | Mandelbaum et al. | 705/65 |
| 5,771,291 A | * | 6/1998 | Newton et al. | 713/185 |
| 5,778,072 A | * | 7/1998 | Samar | 380/30 |
| 5,784,464 A | * | 7/1998 | Akiyama et al. | 713/155 |
| 5,875,480 A | * | 2/1999 | Le Roux et al. | 711/164 |
| 5,923,759 A | * | 7/1999 | Lee | 713/159 |
| 6,044,349 A | * | 3/2000 | Tolopka et al. | 705/1 |

FOREIGN PATENT DOCUMENTS

| | | |
|---|---|---|
| EP | 0 379 333 A1 | 7/1990 |
| EP | 0 501 508 A2 | 9/1992 |
| EP | 0 577 013 A2 | 1/1994 |

\* cited by examiner

*Primary Examiner*—Gregory Morse
*Assistant Examiner*—Matthew Heneghan
(74) *Attorney, Agent, or Firm*—Frishauf, Holtz, Goodman & Chick, P.C.

(57) ABSTRACT

With a portable compact flash card retaining application software/database set in a portable terminal, the portable terminal performs data processing by accessing the application software/database in the CF card. First, the portable terminal reads terminal ID previously stored in the CF card. Then, the portable terminal compares the terminal ID in the CF card with its own terminal ID previously set, and determines whether or not to be able to access the application software/database in the CF card based on the comparison result.

5 Claims, 16 Drawing Sheets

FIG.4A

TERMINAL REGISTRATION TABLE

| TERMINAL NAME | TERMINAL ID | MEDIUM NUMBER |
|---|---|---|
| A1 | ID11 | MO1 |
| A2 | ID12 | MO2 |
| A3 | ID13 | MO3 |
| B1 | ID14 | MO4 |
| B2 | ID15 | MO5 |

APPLICATION-DATA SETTING TABLE

| APPLICATION / DATA | TERMINAL ID | WRITE FLAG |
|---|---|---|
| APPLICATION α1 | ID11 | |
| | ID12 | |
| APPLICATION α2 | ID13 | |
| APPLICATION β1 | ID15 | |
| | ID14 | |
| DATA D1 | ID11 | |
| DATA D2 | ID12 | |
| DATA D3 | ID13 | |
| DATA D4 | ID14 | |
| | ID15 | |

GROUP REGISTRATION TABLE

| TERMINAL GROUP NAME | TERMINAL ID |
|---|---|
| A | ID11 |
| | ID12 |
| | ID13 |
| B | ID14 |
| | ID15 |

9

SECURITY MANAGING SYSTEM, DATA DISTRIBUTION APPARATUS AND PORTABLE TERMINAL APPARATUS

CROSS-REFERENCE TO RELATED APPLICATIONS

This application is based upon and claims the benefit of priority from the prior Japanese Patent Applications No. 11-121200, filed Apr. 28, 1999; and No. 11-266853, filed Sep. 21, 1999, the entire contents of which are incorporated herein by reference.

BACKGROUND OF THE INVENTION

The present invention relates to a security managing system, a data distribution apparatus and a portable terminal apparatus.

In general, a personal computer is separately provided with application software by means of a recording medium such as a floppy disk or a compact disk, and this application software is activated after being installed on the personal computer. In this case, a software maker ships each application software affixed with a unique product number. When a user installs and runs this application software on his or her personal computer, the user is requested to enter this product number through a keyboard as a permitting key.

In an on-line type client/server system which has a plurality of portable terminals connected to one another in a communicatable manner over a network, each client terminal acquires application software over the network. In this case, each client terminal requests the server to transfer the copy of the application software. At this time, the user enters his or her own ID (Identification) and password.

But, application software which is provided via a recording medium can be illegitimately installed in multiple times on a plurality of personal computers once the product number is known. To inhibit such illegitimate copying, it is necessary to clear the entire contents of the recording medium once the application software is installed. If the entire contents of the recording medium are deleted, however, the user cannot deal with a possible case where something goes wrong with the application software later so that reinstallation is needed. Further, this scheme enforces the user to carry out a troublesome work of clearing the contents of the recording medium every time the application software is installed.

In the case where a client terminal gains access to the server over a network, anyone who knows an authentic user ID and password can access the application software from any terminal, which may result in illegitimate access to the application software.

The same is true of the case where highly confidential important data as well as application software is provided by means of a recording medium or over a network. This conventional scheme is not therefore completely security-proof.

BRIEF SUMMARY OF THE INVENTION

Accordingly, it is an object of the present invention to provide a scheme of permitting only a predetermined portable terminal apparatus to gain access to a data retaining recording medium, thus ensuring access control terminal by terminal so as to make it possible to maintain the security and effectively inhibit illegitimate copying by another portable terminal apparatus which does not have an authentic accessing right.

It is another object of this invention to provide a scheme of permitting only a predetermined portable terminal apparatus to gain access to data stored in a recording medium at the time the data is written in the recording medium and distributed in this form, thus ensuring access control terminal by terminal so as to make it possible to maintain the security and effectively inhibit illegitimate copying by another portable terminal apparatus which does not have an authentic accessing right.

To achieve the above object, according to the first aspect of this invention, there is provided a portable terminal apparatus for accessing application software and data, stored in a potable recording medium set in the portable terminal apparatus, for performing data processing, which comprises read means for reading identification information predetermined to a portable terminal apparatus, previously stored as control information in the recording medium, at a time of gaining access to the application software and data in the recording medium; comparison means for comparing the identification information read by the read means with previously set local identification information; and access control means for determining whether or not to permit access to the application software and data in the recording medium based on a result of comparison made by the comparison means.

According to the second aspect of this invention, there is provided a data distribution apparatus for writing application software and data in a portable recording medium to ensure distribution of the application software and data to each portable terminal via the recording medium, which comprises acquisition means for acquiring, as access control information, identification information predetermined and previously assigned to a portable terminal whose access to application software and data has been permitted or inhibited; and write means for writing the portable terminal identification information acquired by the acquisition means in the recording medium in association with the application software and data.

According to the present invention, in a portable terminal apparatus which accesses a recording medium where application software and data are stored and performs data processing, only a predetermined portable terminal device is permitted to access the application software and data in the recording medium. This can ensure access control terminal by terminal so that it is possible to maintain the security and effectively inhibit illegitimate copying by another portable terminal apparatus which does not have an authentic accessing right.

According to the present invention, in a portable terminal apparatus which accesses a recording medium where application software and data are stored and performs data processing, information to permit access to the application software and data in the recording medium is written only in a predetermined portable terminal apparatus. This can ensure access control terminal by terminal so that it is possible to maintain the security and effectively inhibit illegitimate copying by another portable terminal apparatus which does not have an authentic accessing right.

According to the present invention, the data distribution apparatus which carries out data communications with a plurality of portable terminal devices over a network permits only a predetermined portable terminal to access application software/data, thereby prohibiting the application software/data from being illegitimately downloaded and guaranteeing the security.

According to the present invention it is possible to prohibit those portable terminals which have not previously been permitted to use a database stored in a data recording medium from using that database.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the predetermination, illustrate presently preferred embodiments of the invention, and together with the general description given above and the detailed description of the preferred embodiments given below, serve to explain the principles of the invention.

FIG. 4A is a diagram depicting the data structure of a terminal registration table 7;

FIG. 4B is a diagram depicting the data structure of an application-data setting table 8;

FIG. 4C is a diagram depicting the data structure of a group registration table 9;

DETAILED DESCRIPTION OF THE INVENTION (First Embodiment)

A first embodiment of the present invention will now be described with reference to FIGS. 1 through 7.

Figure 1:
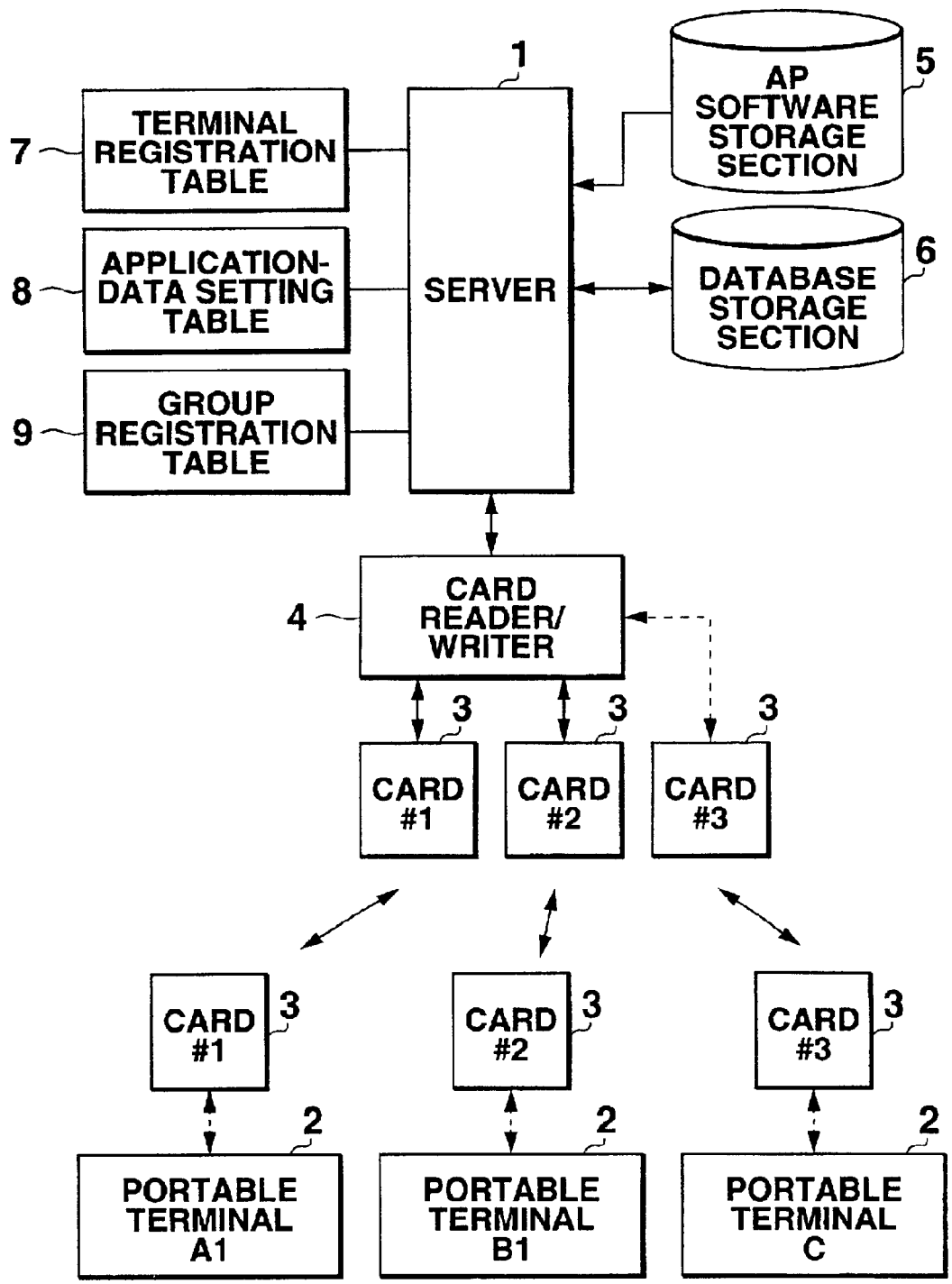
FIG. 1 is a system structural diagram illustrating an off-line type client/server system.

FIG. 1 presents a system structural diagram illustrating an off-line type client/server system.

This off-line type client/server system comprises a server computer 1 sited in a company office and mobile client terminals (portable terminals) 2 that individual business persons of this company carry around. Each business person performs a business work while accessing an application (AP) software/database stored in a portable recording medium 3 which is loaded in the terminal 2 outside the office, unloads the portable recording medium 3 from the terminal 2 at the end of a day's work, and sets it in a card reader/writer 4 of the server computer 1 provided in the office. Then, the server computer 1 performs a process of collecting the business records in the portable recording medium 3 via the card reader/writer 4.

The portable recording medium 3 is a removable compact flash card and will hereinafter be called "CF card 3". A plurality of CF cards 3 are simultaneously loadable in the card reader/writer 4 attached to the server computer 1. The card reader/writer 4 accesses the individual CF cards 3 one by one to perform data reading/writing.

In FIG. 1, "#1", "#2" and "#3" affixed to the CF cards 3 indicate that the CF cards 3 are associated with the portable terminals 2 indicated by terminal names "A1", "B1" and "C1", in one-to-one correspondence.

Although this embodiment uses a CF card 3 associated with a terminal group, which will be discussed later, in addition to the CF card 3 associated with each portable terminal, FIG. 1 exemplifies only those terminal-associated CF cards 3.

The server computer 1 distributes an application (AP) software/database to each portable terminal 2 via the associated CF card 3.

Specifically, the server computer 1 reads out the contents of an AP software storage section 5 and a database storage section 6 and provides the card reader/writer 4 with the contents and writes the AP software/database in the individual CF cards 3 loaded in the card reader/writer 4. At this time, the server computer 1 determines what should be written in which terminal by referring to an application-data setting table 8, specifies and writes an AP software/database in the associated CF card 3, and writes terminal identification information (terminal ID) in that CF card 3 as access control information for the AP software/database.

Figure 2A:
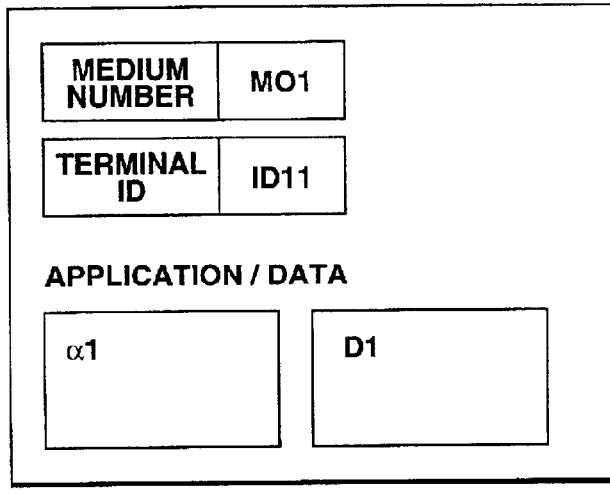
FIG. 2A is a diagram showing data in a CF card 3 associated with a terminal.
Figure 2B:
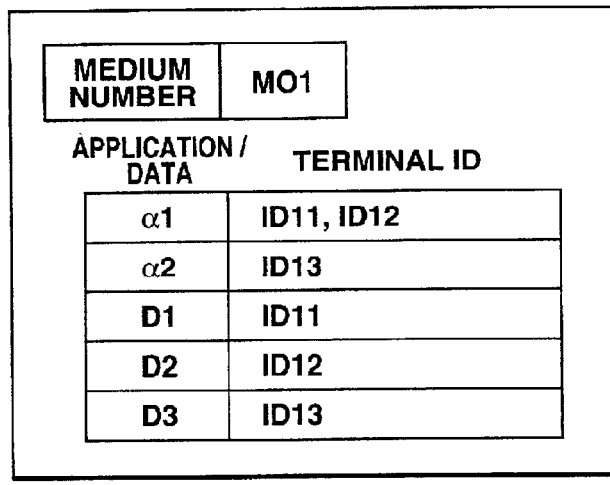
FIG. 2B is a diagram showing data in a CF card 3 associated with a terminal group A.
Figure 2C:
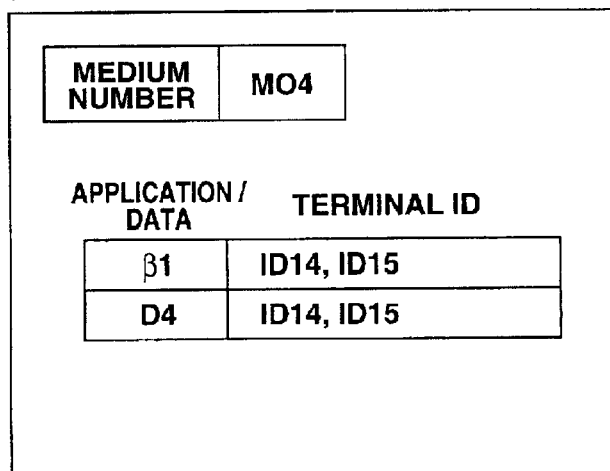
FIG. 2C is a diagram showing data in a CF card 3 associated with a terminal group B.

FIGS. 2A through 2C show data stored in the CF cards 3. FIG. 2A shows the contents of the terminal-associated CF card 3.

This terminal-associated CF card 3 is designed to store a medium number predetermined to itself to identify the CF card 3, a predetermined terminal ID for identifying the portable terminal 2 that uses this card and AP software and database. In this example, a medium number "M01"a, terminal ID "ID11", AP software "α1" and database "D1" are stored in the CF card 3. The correlation between the AP software/database and the terminal ID defines the terminal that is given a permission to access the AP software/database. One terminal ID is set for one terminal-associated CF card 3.

Figure 3:
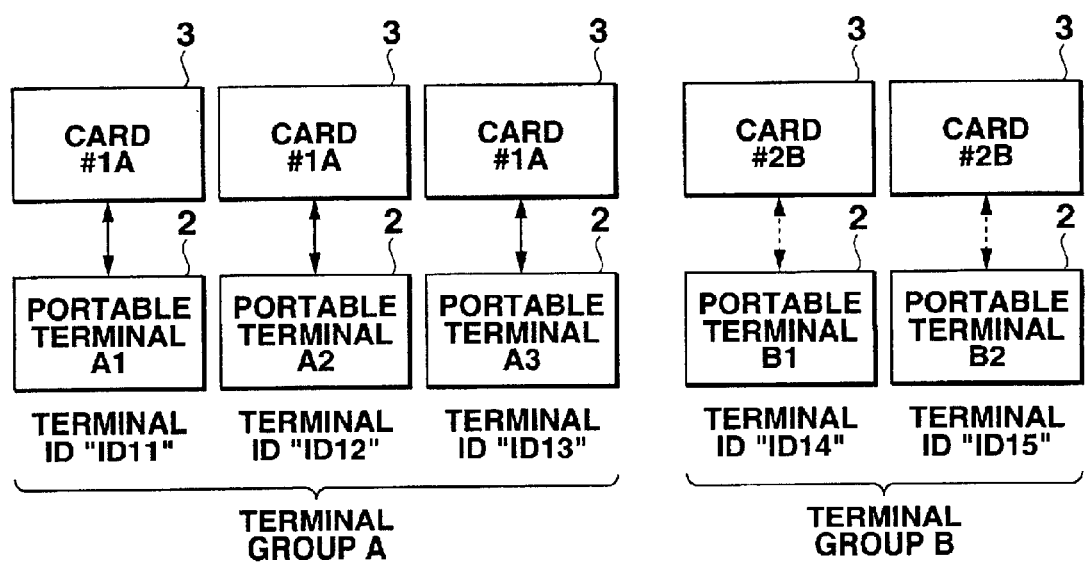
FIG. 3 is a diagram for explaining the terminal groups A and B.

FIG. 2B shows the contents of a CF card 3 associated with a terminal group A. As shown in FIG. 3, the individual CF cards 3 affixed with "#1A" are recording media associated with the terminal group A to which the individual portable terminals 2 respectively having terminal names "A1", "A2" and "A3" belong. In each group-associated CF card 3, one terminal ID or more than one terminal ID are stored for each of various kinds of AP software/databases in addition to the "medium number", and other data than the "medium number" are identical to those of the other CF cards 3 in that group.

The terminal ID like that shown in FIG. 2A is predetermined terminal identification information assigned to each of the portable terminals 2 that belong to the terminal group A as shown in FIG. 3, and the correlation between the AP software/database and this terminal ID defines the terminal that is given a permission to access the AP software/database as in the case of the terminal-associated CF card 3.

FIG. 2C shows the contents of a CF card 3 associated with a terminal group B. As the data structure is the same as that for the case of the terminal group A as shown in FIG. 2B, its explanation will not be repeated. As shown in FIG. 3, the terminal ID set in each CF card 3 associated with the terminal group B is predetermined terminal identification information assigned to each of the portable terminals 2 that belong to the terminal group B.

FIGS. 4A through 4C show the data structures of a terminal registration table 7, the application-data setting table 8 and a group registration table 9 provided on the server computer 1 side. FIG. 4A shows the contents of the terminal registration table 7.

This terminal registration table 7 is referred to at the time the application-data setting table 8 is created or an AP software/database is written in any terminal-associated CF card 3. This terminal registration table 7 has "terminal names", "terminal IDs" and "medium numbers" associated in one another, which are to be set or registered when the system is constructed or new medium is to be additionally used.

The application-data setting table 8 is designed to store one terminal ID or more than one terminal ID in association with the name of each AP software and the name of each database for the AP software/database, as shown in FIG. 4B. The server computer 1 refers to this application-data setting table 8 at the time of writing the AP software/database in the CF card 3.

FIG. 4C shows a group registration table 9 denoting a relationship between the group names A and B and the corresponding terminal IDs. In FIG. 4C, terminals ID11, ID12 and ID13 are shown as to belong to the group A, while terminals ID14 and ID15 belong to group B.

Figure 5:
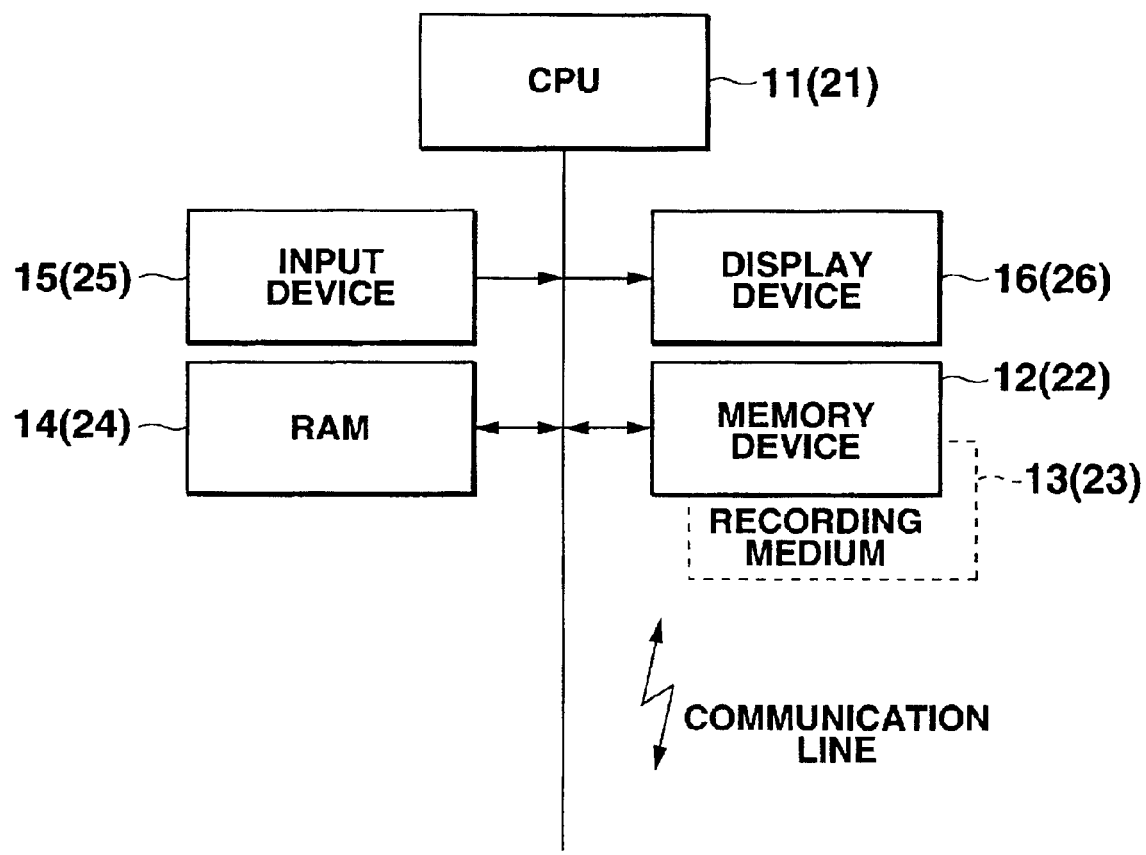
FIG. 5 is a block diagram illustrating the general structure of a server computer 1 (portable terminal 2)

FIG. 5 is a block diagram illustrating the general structures of the server computer 1 and the portable terminal 2.

Because the constituting component of the server computer 1 are basically the same as those of the portable terminal 2, their structures will be discussed below referring to the components of the server computer 1 by numerals "11" to "16" and referring to the components of the portable terminal 2 by numerals "21" to "26".

A CPU 11 (21) is a central processing unit which controls the general operation of the server computer 1 (portable terminal 2) according to various kinds of programs. A memory device 12 (22) has a recording medium 13 (23) where an operating system, various kinds of application programs, a database, character font data, etc. have previously been stored, and a drive system (not shown) for this recording medium.

The recording medium 13 (23) is a fixed type or a removable type and is a magnetic or optical recording medium or a semiconductor memory, such as a floppy disk, a hard disk, an optical disk or a RAM card.

The program and data in the recording medium 13 (23) is loaded into a RAM 14 (24) as needed under the control of the CPU 11 (21). The CPU 11 (21) has capabilities of receiving a program and data transmitted from another device via a communication line or the like and storing them in the recording medium, and using a program and data stored in another recording medium provided in another device via a communication line or the like.

The CPU 11 (21) is connected by bus lines to an input device 15 (25) and a display device 16 (26), which are its input/output peripheral devices, and controls the operations of those devices in accordance with an input/output program.

The operation of this client/server system will now be described with reference to the flowcharts illustrated in FIGS. 6 and 7.

Note that the program that accomplishes various functions described in those flowcharts is stored in the recording medium 13 (23) in the form of readable program codes according to which the CPU 11 (21) executes the operations as needed. The same is true in the following embodiments which will be discussed later.

Figure 6:
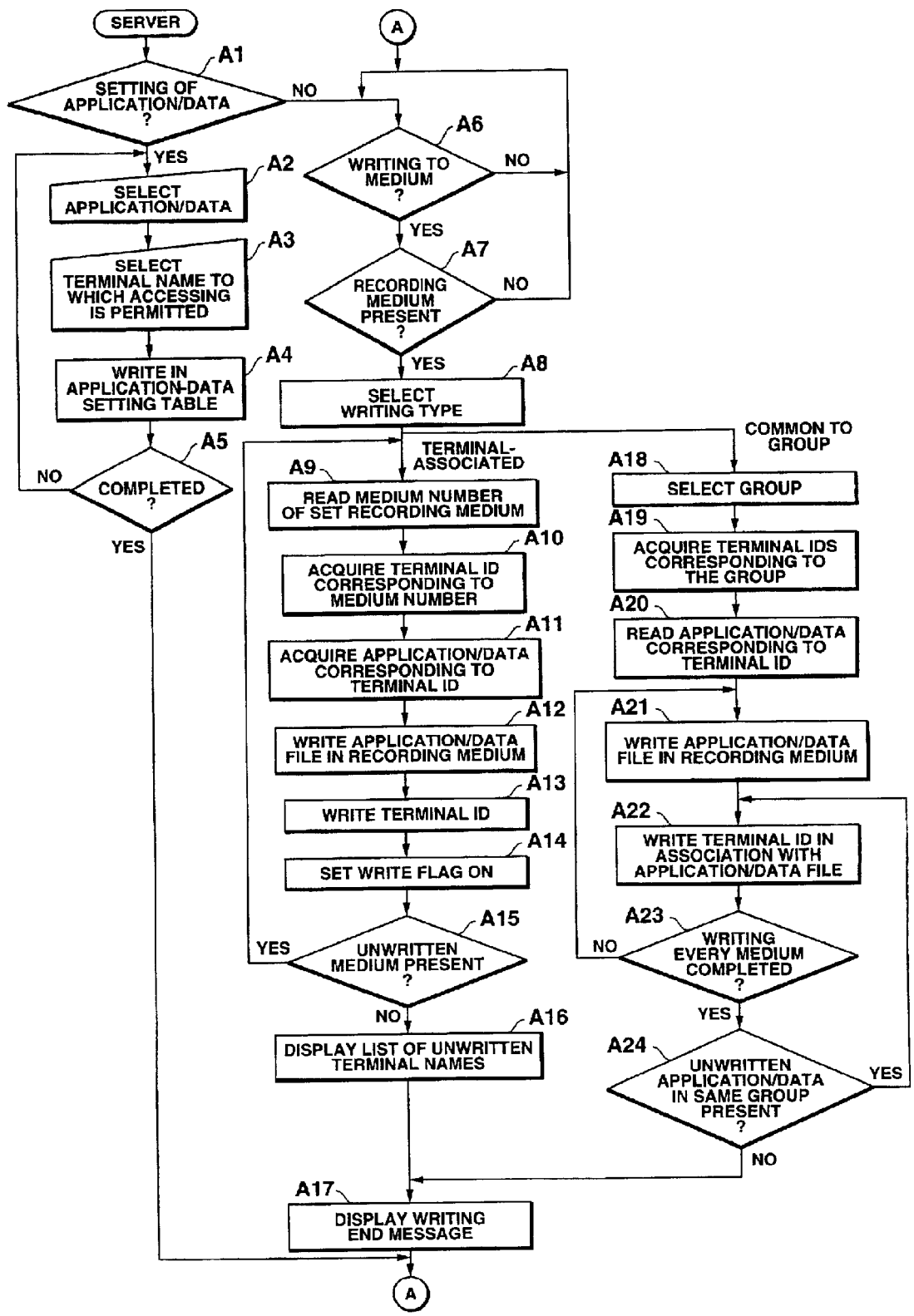
FIG. 6 is a flowchart illustrating the characterizing operation of the server computer 1.

FIG. 6 presents the flowchart that illustrates the characterizing operation of the server computer 1.

First, when a setting/registration instruction to arbitrarily set the contents of the application-data setting table 8 is given to the application-data setting table 8 (step A1), the name of an AP software/database to be set in the application-data setting table 8 is selected (step A2) and the terminal name of the portable terminal 2 which is to be permitted to access this AP software/database is selected (step A3).

When the selected name of the AP software/database is written in the application-data setting table 8, the terminal ID that corresponds to the selected terminal name is acquired from the terminal registration table 7 and is written in the application-data setting table 8 in association with the name of the AP software/database (step A4). When setting one record of data in the application-data setting table B is finished, it is checked if a setting end has been instructed (step A5) and the above-described operation is repeated until the setting end instruction is issued (steps A2 to A4).

When writing of data to a CF card 3 is instructed (step A6), the flow proceeds to a process of writing the CF card 3 on the condition that the CF card 3 is set in the card reader/writer 4 (step A7). First, a writing type is selected (step A8).

When a user selectively designates writing to a terminal-associated CF card 3 or writing to a terminal-group-associated CF card 3, the selected writing type is discriminated. If writing to a terminal-associated CF card 3 has been selectively designated, the "medium number" is read from the CF card 3 set in the card reader/writer 4 (step A9) and the terminal ID corresponding to the medium number is acquired from the terminal registration table 7 (step A10).

Then, based on the terminal ID, the application-data setting table 8 is searched for the name of the AP software/database corresponding to the terminal ID and the corresponding AP software/database is read from the AP software storage section 5 and the database storage section 6 according to the acquired name (step A11).

If the terminal ID is "ID11" in the application-data setting table 8 shown in FIG. 4B, for example, "α1" is read from the AP software storage section 5 as the corresponding AP software and "D1" is read from the database storage section 6 as the corresponding database.

The thus acquired AP software/database corresponding to the terminal ID is written in the CF card 3 (step A12), and the terminal ID acquired in the step A10 is written there as access control information for the AP software/database (step A13). When this writing is completed, a "write flag" which indicates that writing is done is set ON in the application-data setting table 8 in association with the terminal ID (step A14).

When a plurality of CF cards 3 are set in the card reader/writer 4, it is checked if there is any unwritten CF card 3 (step A15). If there is such an unwritten CF card 3, the flow returns to step A9 to access the next CF card 3 to read its "medium number" and a writing process similar to the above-described one is performed on that CF card 3. When writing all the CF cards 3 set in the card reader/writer 4 is completed, the terminal ID for which the "write flag" is not set is extracted by referring to the application-data setting table 8, the terminal name corresponding to this terminal ID is acquired from the terminal registration table 7 and is displayed and listed as the name of an unwritten terminal (step A16) and a writing end message is displayed (step A17).

When writing to a terminal-associated CF card 3 has been selectively designated, on the other hand, a selection menu screen for terminal group names is displayed. When the user selectively designates a desired group name from the screen (step A18), the group registration table 9 is searched for a plurality of corresponding terminal IDs based on this group name (step A19).

Based on those terminal IDs, the contents of the application-data setting table 8 are searched from the top of the table B. When any of the acquired terminal IDs is present in the application-data setting table 8, an AP software/database corresponding to that terminal ID is read from the AP software storage section 5 and the database storage section 6 (step A20).

If the terminal group A has been selected, for example, the AP software "α1" is acquired. Then, the obtained AP software/database is written together with the corresponding terminal ID in the CF card 3 (steps A21 and A22). In this case, the AP software "α1" and the terminal IDs "ID11" and "ID12" are written in the CF card 3 in association with one another. The above-described operation is repeated until writing to every CF card 3 set in the card reader/writer 4 is completed (steps A21 to A23).

When writing to all the media is completed, the flow proceeds to step A24 to check if any unwritten AP software/database in the same group is present in the application-data setting table 8. When such an unwritten AP software/database exists, the flow returns to step A20 and "α2" is read as AP software corresponding the terminal group A and is written together with the terminal ID "ID13" in each CF card 3.

Thereafter, the database "D1" and the terminal ID "ID11" are similarly written in each CF card 3, followed by the writing of a database "D2" and terminal ID "ID12" in each CF card 3, then by the writing of a database "D3" and terminal ID ID13" therein. As a result, the contents of the individual CF cards 3 corresponding to the terminal group A become as shown in FIG. 2B. When writing associated with the terminal group A is completed, the write end message is displayed (step A17). The CF cards 3 in which the AP software/database has been written are distributed to the corresponding portable terminals 2.

Figure 7:
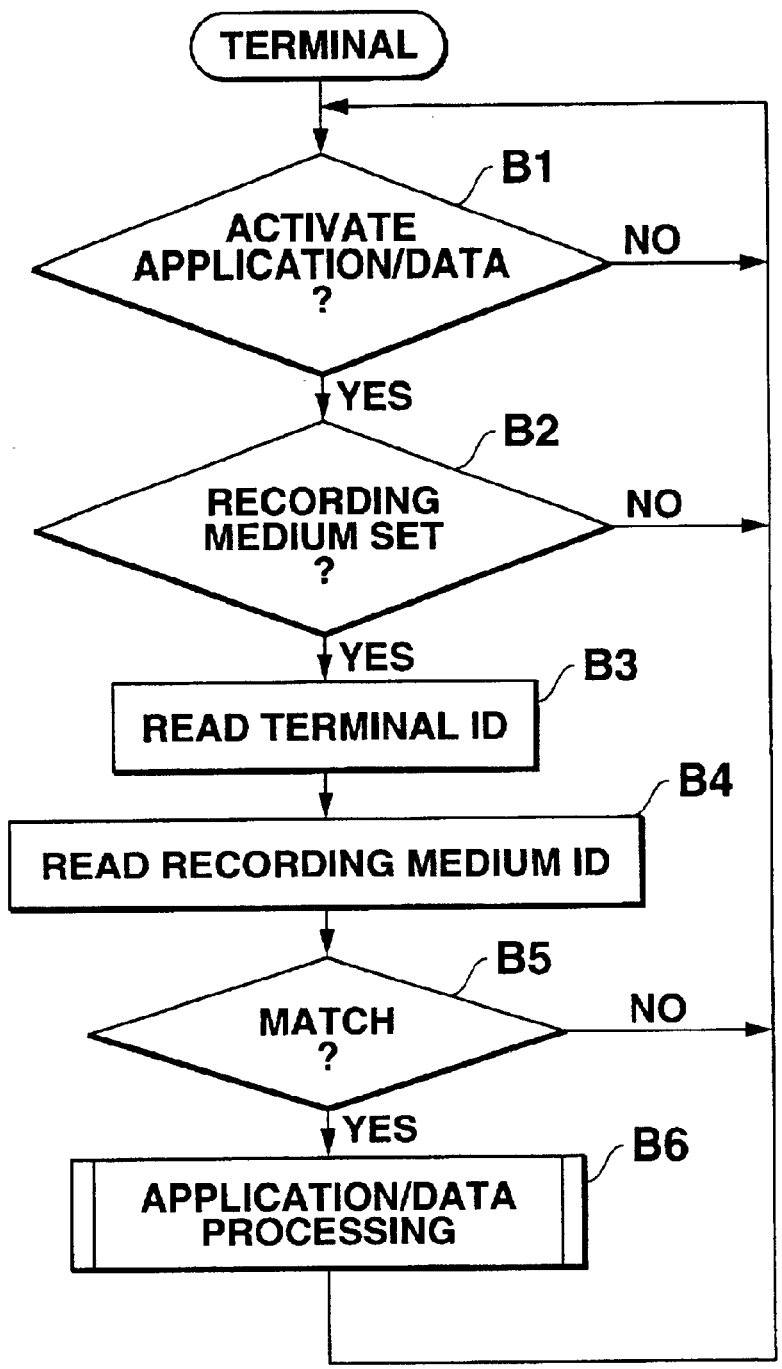
FIG. 7 is a flowchart illustrating the characterizing operation of the portable terminal 2.

FIG. 7 is a flowchart illustrating the operation of the portable terminal 2 which is activated or initiated when the portable terminal 2 is powered on.

First, when an arbitrary AP software/database is selected from the initial menu screen and activation of the AP software/database is instructed (step B1), if no CF card 3 is set in that portable terminal 2 (step B2), the flow returns to step B1 to invalidate the activation. If the CF card 3 is set in the portable terminal 2, however, the local terminal ID previously set is read out (step B3).

Then, the CF card 3 is accessed to read the terminal ID therefrom (step B4), and it is checked if the read terminal ID coincides with the local terminal ID (step B5). In this case, as other terminal IDs belonging to the same group are stored in the group-associated CF card 3 for each AP software/database, the terminal ID corresponding the selectively designated AP software/database is read from the CF card 3 and it is checked if those terminal IDs include the local terminal ID.

When the terminal IDs match with each other, access to the selectively designated AP software/database is allowed and the flow goes to a step of executing the associated process (step B6). When the terminal IDs do not match with each other, on the other hand, the flow returns to step B1 so that access to the AP software/database is inhibited.

According to the first embodiment, as described above, at the time of accessing an AP software/database in the CF card 3 and performing data processing, the portable terminal 2 compares the terminal ID read from the CF card 3 with the its own terminal ID previously set and access to the AP software/database in the CF card 3 is controlled based on whether or not there is a match in the comparison process. This makes it possible to permit only a predetermined portable terminal 2 to access the AP software/database in the CF card 3.

In other words, portable terminals 2 that can access the AP software/database in the CF card 3 are restricted, thus ensuring access control terminal by terminal and effective prohibition of illegitimate copying by any portable terminal 2 which does not have an authentic accessing right.

The same is true of a group-associated CF card 3 as well as a terminal-associated CF card 3. When a predetermined AP software/database is used for each business area, access control for each terminal group is possible if the terminal groups are separated area by area.

When the terminal IDs are stored in the CF card 3 in association with the individual AP software/databases, it is possible to carry out access control terminal by terminal and for each AP software/database. That is, in a case where a plurality of AP software/databases are stored in the CF card 3, it is possible to permit access to a predetermined AP software/database but inhibit access to the other AP software/databases, so that even the portable terminals 2 belonging to the same terminal group can individually be subjected to access control for each AP software/database.

The server computer 1 writes an AP software/database in a CF card 3 and permits distribution of the AP software/database via this CF card 3. At this time, the server computer 1 reads the terminal ID associated with this CF card 3 and writes this terminal ID together with the AP software/database in the CF card 3. This makes it possible to specify the portable terminal 2 which is to be given a permission to access the AP software/database.

This can ensure access control terminal by terminal and effectively prohibit illegitimate copying by another portable terminal which does not have an authentic accessing right.

Further, the server computer 1 can specify an AP software/database to be written for each terminal-associated CF card 3 by referring to the application-data setting table B that defines the terminals which are permitted to access each AP software/database.

The same is true of a group-associated CF card 3 as well as a terminal-associated CF card 3. It is possible to specify a terminal group which is permitted to access each AP software/database by writing the terminal IDs of the individual portable terminals 2 belonging to the same terminal group in the CF card 3. This can ensure access control terminal by terminal.

(Second Embodiment)

Figure 9:
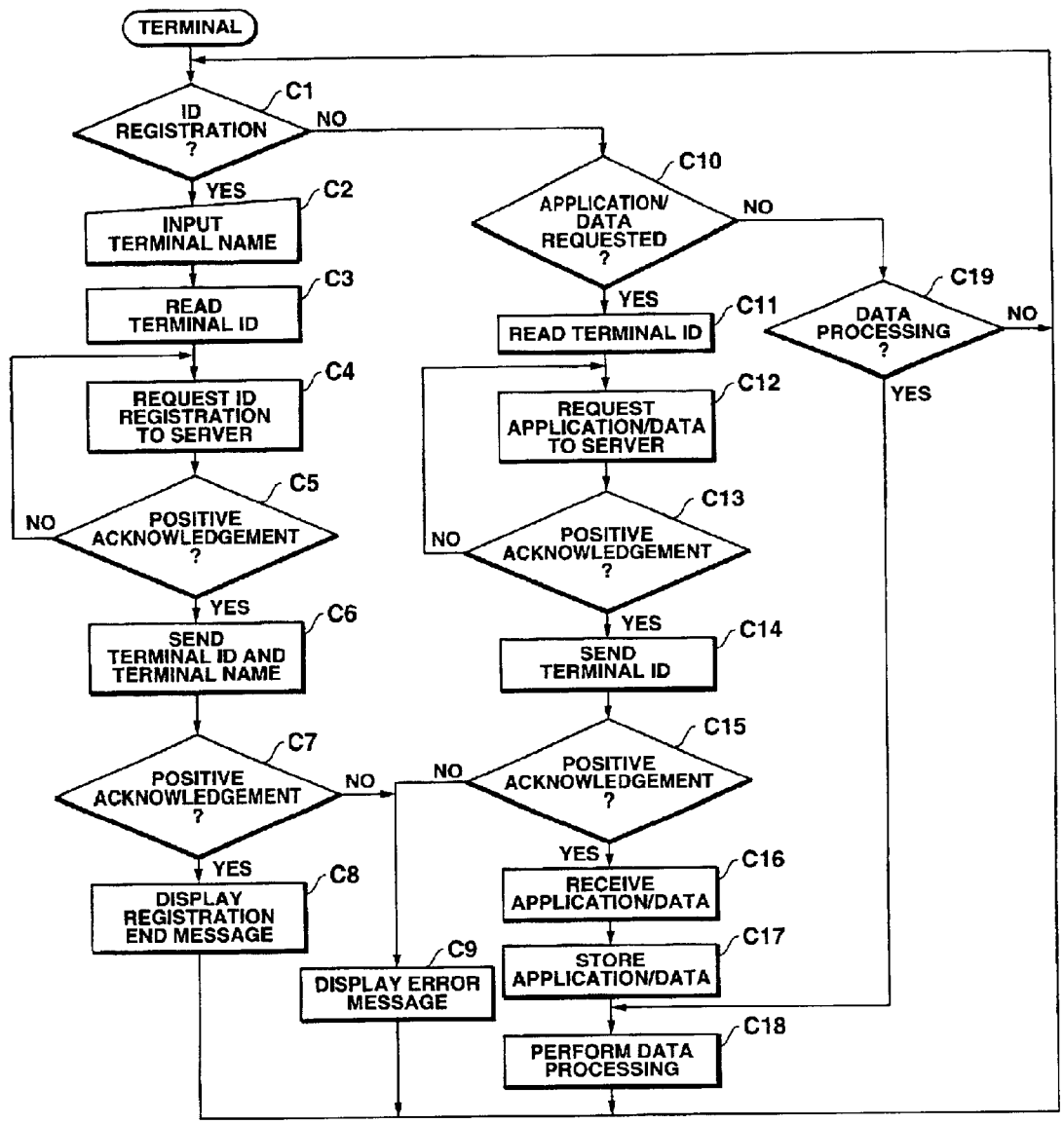
FIG. 9 is a flowchart illustrating the operation of a client terminal 32.
Figure 10:
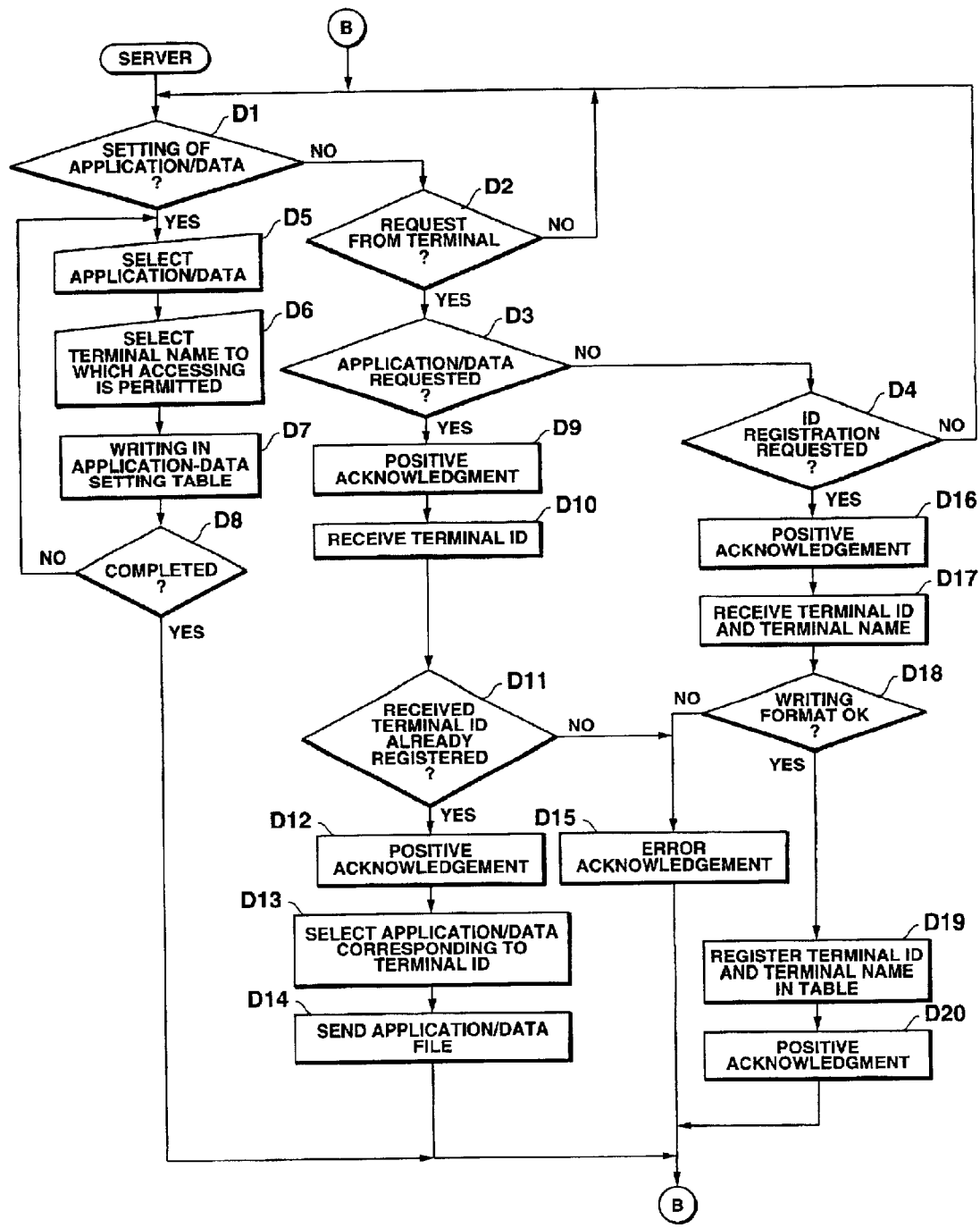
FIG. 10 is a flowchart illustrating the operation of a server computer 31.

A second embodiment of this invention will now be described with reference to FIGS. 8 through 10.

While the first embodiment is directed to an off-line type client/server system in which the server computer 1 exchanges data with the portable terminals 2 via portable recording media 3, the second embodiment is adapted to an on-line client/server system which has a plurality of client terminals connected in a communicatable manner to the server computer over a network. The second embodiment basically has the same structure as the first embodiment.

Figure 8:
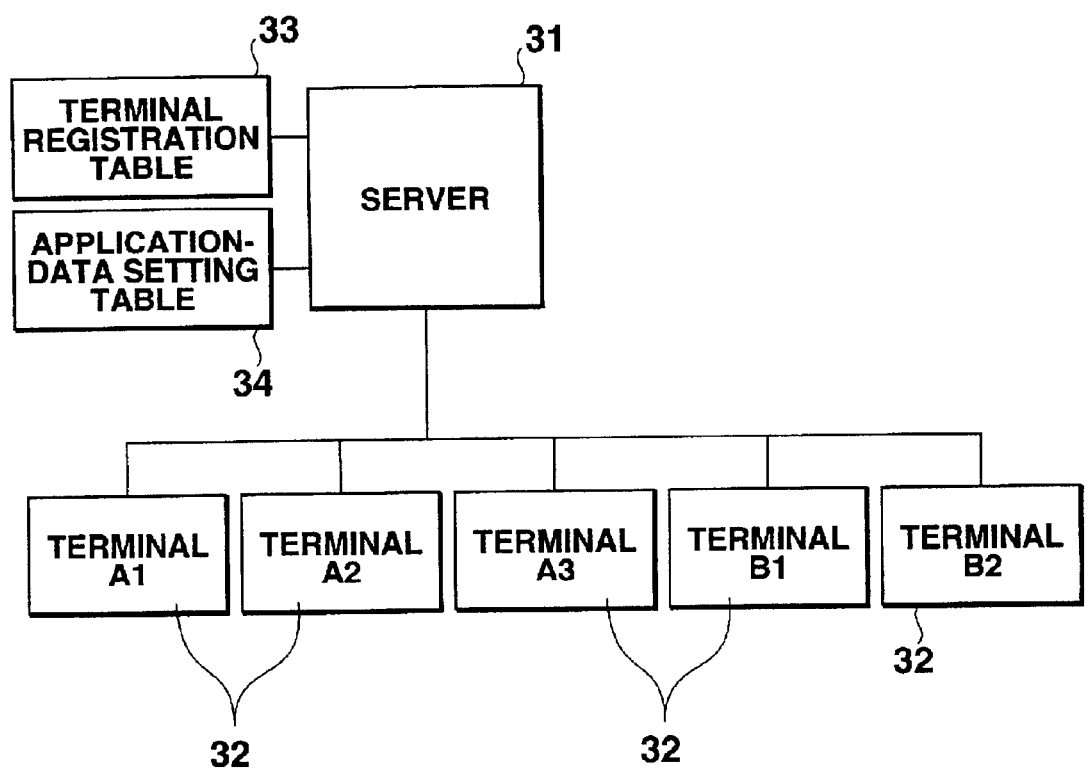
FIG. 8 is a system structural diagram illustrating an on-line type client/server system.

FIG. 8 is a system structural diagram illustrating the client/server system according to the second embodiment. This client/server system is a local area network or wide area network system which has a plurality of client terminals 32 connected to a server computer 31 via an exclusive line or a public line.

This server computer 31 is provided with a terminal registration table 33 and an application-data setting table 34. The terminal registration table 33 and application-data setting table 34 basically have the same structures as the terminal registration table 7 and the application-data setting table 8 (see FIGS. 4A and 4B) of the first embodiment. The terminal registration table 33 has "terminal names" associated with "terminal IDs".

The application-data setting table 34 stores one terminal ID or more than one terminal ID each identifying the terminal that is permitted to access each AP software/database in association with that AP software/database.

When one client terminal 32 requests the server computer 31 to send an AP software/database, the server computer 31 refers to the terminal registration table 33 and the application-data setting table 34 to check if this terminal is permitted to access that AP software/database. On the condition that the requesting terminal is such an access-granted terminal, the server computer 31 sends the AP software/database to the requester.

The operation of the second embodiment will now be discussed with reference to the flowcharts shown in FIGS. 9 and 10. FIG. 9 illustrates the operation of the client terminal 32, and FIG. 10 illustrates the operation of the server computer 31.

First, when ID registration to register the local terminal ID of one client terminal 32 in the terminal registration table 33 in the server computer 31 is instructed on the client terminal 32 (step C1), the local terminal name is input (step C2), the local terminal ID previously set is read out (step C3), a request for ID registration is kept issued to the server computer 31 until a positive acknowledgement (positive response) is received (steps C4 and C5).

If there is a positive acknowledgement, the terminal ID is sent to the server computer 31 (step C6). When the request from the terminal is for ID registration (steps D2 to D4), the server computer 31 returns a positive acknowledgement to the requester indicating that the request has been properly received (step D16). When the server computer 31 receives the terminal name and terminal ID from the client terminal 32 as a consequence (step D17), the server computer 31 checks if the received information has a previously determined format (step D18). When the information has such a format, the server computer 31 registers the terminal name and the terminal ID in the terminal registration table 33 in association with each other (step D19).

Then, the server computer 31 sends a positive acknowledgement to the requester indicating that the registration has been made properly (step D20).

When the terminal name and terminal ID sent from the terminal do not have the predetermined format, on the other hand, the server computer 31 sends an error acknowledgement to the requester (step D15).

If the positive acknowledgement is sent from the server computer 31 (step C7), the client terminal 32 displays a registration end message (step C8). If the error acknowledgement is sent from the server computer 31, the client terminal 32 displays an error message (step C9).

Every time the server computer 31 is requested for ID registration by each client terminal 32, the server computer 31 registers the terminal name and the terminal ID in the terminal registration table 33 in association with each other.

When an instruction to set which terminal to get a permission to access an AP software/database for each AP software/database is given on the server computer 31, the application-data setting table 34 is created (steps D1 and D5–D8) in the same way as done in the first embodiment (steps A1–A5 in FIG. 6).

When the client terminal 32 gives a request to send an AP software/database with the terminal registration table 33 and application-data setting table 34 prepared on the server computer 31 (step C10 in FIG. 10), the client terminal 32 reads the local terminal ID previously set (step C11) and keeps sending the transmission request for the AP software/database to the server computer 31 until a positive acknowledgement is received (steps C12 and C13). When the positive acknowledgement is received, the client terminal 32 sends the terminal ID (step C14).

If the request from the client terminal 32 is a transmission request for the AP software/database (steps D2 and D3), the server computer 31 sends a positive acknowledgement to the requester (step D9) and waits for the terminal ID. When receiving the terminal ID from the requester (step D10), the server computer 31 searches the terminal registration table 33 based on the received terminal ID to check if the request has come from an authentic terminal previously registered (step D11).

If the request has not come from an authentic terminal, the server computer 31 sends an error acknowledgement to the requester (step D15). If the request is from an authentic terminal, the server computer 31 sends a positive acknowledgement to the requester (step D12) and searches the application-data setting table 34 based on the terminal ID to selectively read the AP software/database corresponding to the terminal ID and sends the AP software/database to the requester (steps D13 and D14). In this case, if there are a plurality of AP software/databases corresponding the terminal ID, all the AP software/databases may be sent to the requester, but if the transmission request is for only a desired AP software/database, the requested AP software/database alone is transmitted.

When an error acknowledgement is sent from the server computer 31 (step C15), the client terminal 32 displays an error message (step C9). When a positive acknowledgement is sent (step C15), however the client terminal 32 receives, registers and saves the AP software/database transmitted from the server computer 31 (steps C16 and C17).

Then, the client terminal 32 activates this AP software/database and initiates data processing (step C18).

With the AP software/database from the server computer 31 registered and saved, the client terminal 32 can freely carry out data processing according to the AP software/database anytime in response to the activation instruction (steps C19 and C18).

According to the on-line type client/server system of the second embodiment, as described above, when any client terminal 32 makes a request to access an AP software/ database, the terminal ID sent from the requesting client terminal 32 is compared with the terminal ID corresponding to the AP software/database stored in the application-data setting table 34 and whether or not to permit access that AP software/database is determined based on the comparison result. By permitting only a predetermined terminal to access the AP software/database, it is possible to prohibit the AP software/data from being illegitimately downloaded and to guarantee the security.

(Third Embodiment)

A third embodiment of this invention will now be described with reference to FIGS. 11 through 16.

To avoid the redundant description, like or same reference numerals are given to those components which are the same as the corresponding components of the first embodiment.

Figure 11:
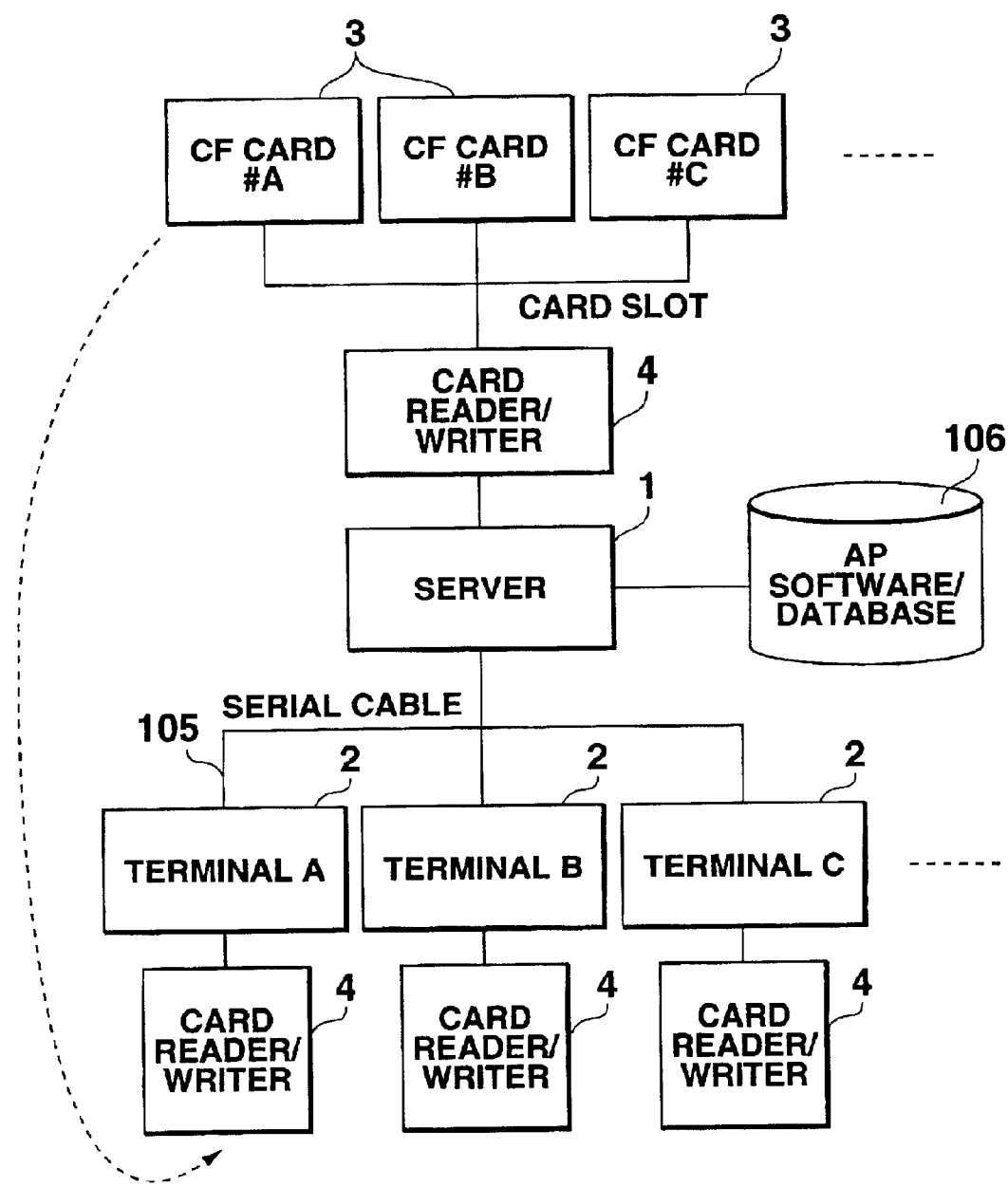
FIG. 11 is a block diagram showing the general structure of a security managing system.

FIG. 11 is a block diagram showing the general structure of a security managing system according to the third embodiment.

This security managing system provides a portable terminal with application software/data which is stored and managed on the server side by means of a portable recording medium, and guarantees the security of the application software/data in this recording medium to thereby prevent a third party from illegitimately copying the application software/data.

This system comprises a server 1 sited in a company office in, for example, a company organization and mobile client terminals (portable terminals) 2 that individual business persons carry around. Each business person does a business work while accessing application software/data stored in a CF card 3 outside the office.

The portable terminals 2 can be connected in a detachable manner to the server 1 by serial cables 105.

That is, the server 1 and the portable terminals 2 can be connected as needed.

The server 1 distributes an application software/database file (hereinafter called "AP software/data") to the portable terminals 2 via the CF cards 3.

When AP software/data to be written in the CF card 3 or AP software/data to be distributed is arbitrarily designated, the server 1 accesses an AP software/database storage section 106 to read the corresponding AP software/data and sends it to the card reader/writer 4 to thereby write the AP software/data in one CF card 3 or more than one CF card 3 set in the card reader/writer 4.

At this time, the management information of the AP software/data stored in the CF card 3 or the areas of FAT (File Allocation Table) and the root directory are designated and the contents of those areas are scrambled (encrypted). In this case, scrambling is carried out by using an encryption key arbitrarily generated for the scrambling process.

It is to be noted that any scheme can be used to carry out scrambling (encryption) and the management information for AP software/data may be encrypted using an arbitrarily generated encryption key.

Preset predetermined terminal identification information (production serial number) is stored in each portable terminal 2. The server 1 reads the predetermined terminal identification information (production serial number) from each portable terminal 2 and encrypts the terminal identification information using an arbitrarily generated encryption key and writes the encrypted information in the CF card 3. The encryption key used in encrypting the terminal identification information and the encryption key that has been used in the scrambling process are written in the portable terminal 2.

With the CF card 3 retaining AP software/data set in a card reader 107, at the time of accessing the AP software/database in the CF card 3, the portable terminal 2 reads the encrypted terminal identification information from this card 3 and reads from the server 1 the encryption key for terminal identification information stored in the local memory and restores the encrypted terminal identification information using this encryption key.

Then, the portable terminal 2 reads the terminal identification information previously set in the local memory and compares this terminal identification information with the restored terminal identification information. When both terminal identification information coincide with each other, the portable terminal 2 restores the scrambled management information for AP software/data.

At this time, access to AP software/data is permitted by reading the encryption key for scrambling and restoring the FAT and root directory of the AP software/data by using the encryption key.

Figure 12:
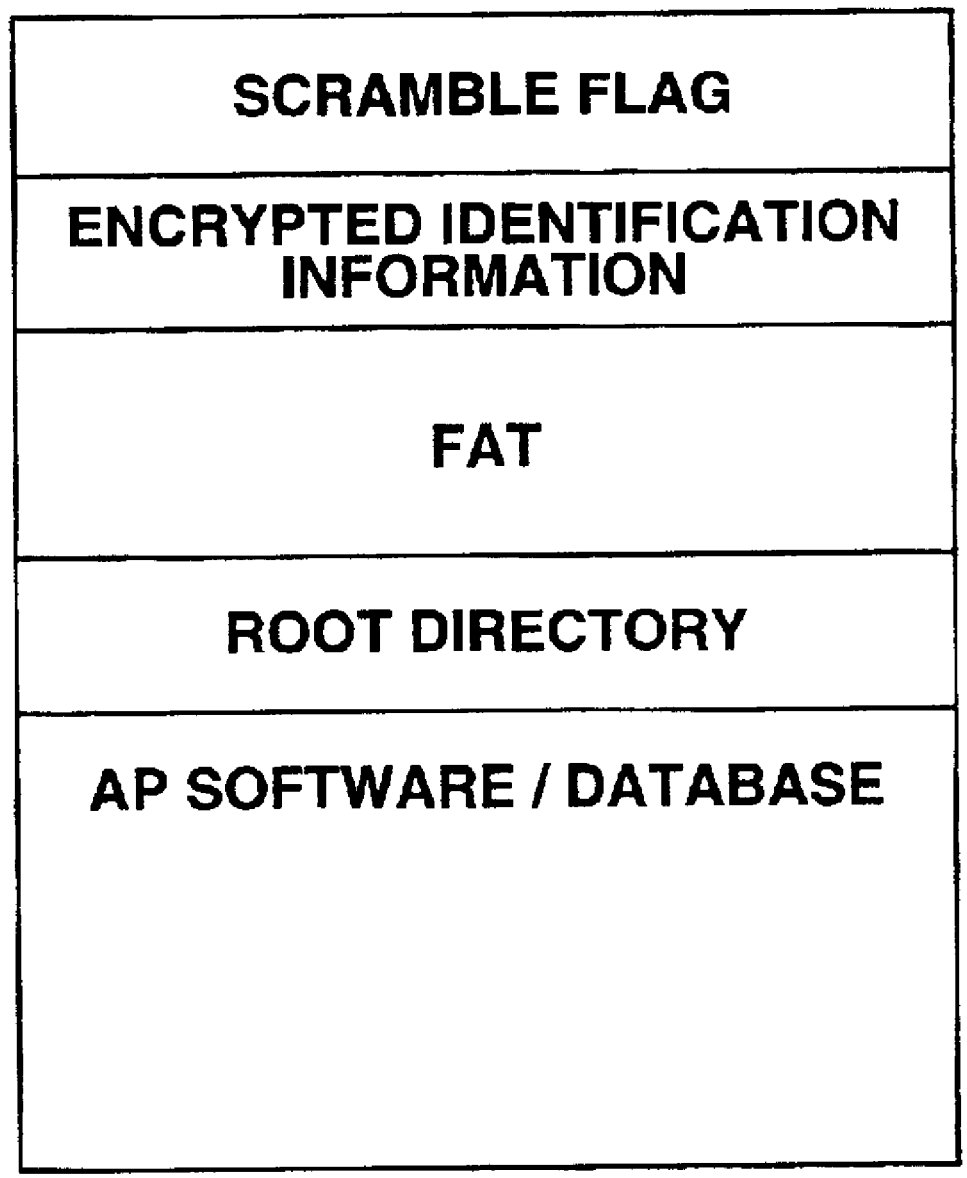
FIG. 12 is a diagram showing the contents of the CF card 3.

FIG. 12 shows the contents of the CF card 3 in which a "scramble flag", "encrypted identification information", "FAT", "root directory" and "AP software/database" are written by the server 1.

The "scramble flag" indicates that the "FAT" and "root directory" of AP software/database stored in the CF card 3 are scrambled. The "encrypted identification information" is the predetermined terminal identification information (production serial number) read from the portable terminal 2 that is encrypted by the server 1. The "FAT" and "root directory" are management information for managing one or more than one AP software/data and have been scrambled.

Figure 13:
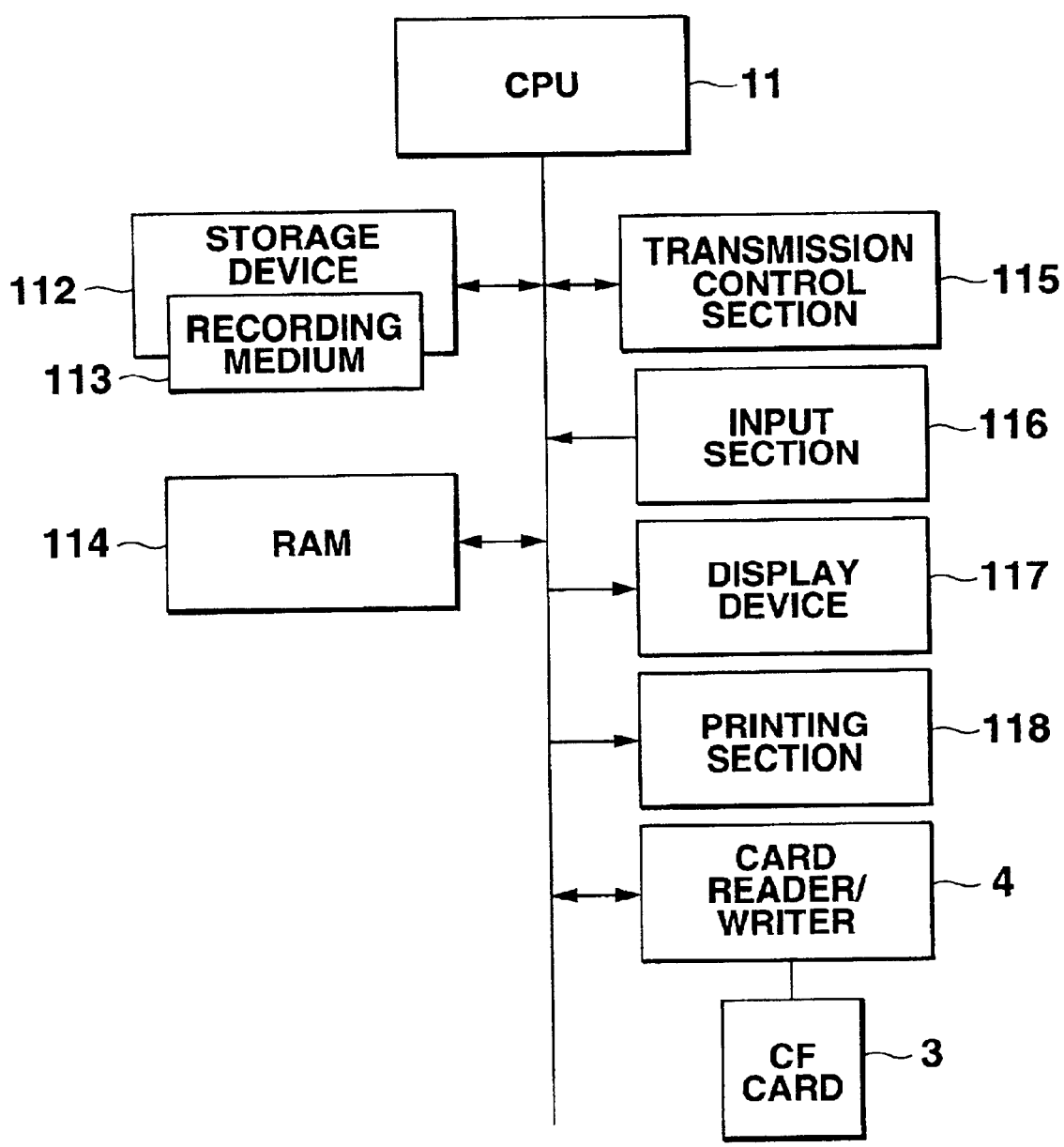
FIG. 13 is a block diagram showing the general structure of a server 1/each portable terminal 2.

FIG. 13 is a block diagram showing the general structure of the server 1, and since the general structure of the portable terminal 2 is the same as that of the server 1, FIG. 13 also shows a block diagram of the portable terminal 2.

The CPU 11 is a central processing unit which controls the general operation of the server 1 or the portable terminal 2 according to the operating system and/or various kinds of application software stored in a memory device 112.

The memory device 112 has a recording medium 113 where a database, character font data and so forth are stored in addition to the operating system and various kinds of application software, and a drive system (not shown) for this recording medium. The recording medium 113 is constituted of a magnetic, optical or semiconductor memory or the like.

This recording medium 113 is a fixed medium such as a hard disk or a portable medium such as a removable CD-ROM, floppy disk, RAM card or magnetic card.

The program and data in the recording medium 113 are loaded into a RAM (e.g., static RAM) 114 and data in the RAM 114 is saved in the recording medium 113 as needed under the control of the CPU 11.

The recording medium may be provided on an external device such as a server, in which case the CPU 11 can directly access and use the program/database in the recording medium via a transmission medium or line.

The CPU 11 can acquire some or all of what is to be stored in the recording medium 113 from another device via a transmission medium and can newly register or additionally register it in the recording medium 113.

That is, the CPU 11 can receive the program/database that is transmitted from another device which constitutes a computer communications system (e.g., a server/host/client computer) via a cable transmission line such as a communication line or a cable or a radio transmission path such as radio waves, microwaves or infrared rays by means of a transmission control section 115, and installs it in the recording medium 113.

The program/database may be stored and managed on an external device side, such as a server, in which case the CPU 11 can directly access and use the program/database on the external device side via a transmission medium.

As apparent from the above, the CPU 11 can execute the predetermined operation of this embodiment by using not only the program/database that has previously been installed in a permanent form, but also the program/database that is externally supplied via a recording medium or a transmission medium, or the program/database that is stored and managed on an external device side.

The CPU 11 is connected to the transmission control section 115, an input section 116, a display device 117, a printing section 118 and a card reader/writer 4, which are input/output peripheral devices of the CPU 11, by bus lines, and controls the operations of those units according to an input/output program. The transmission control section 115 is a communications interface including, for example, a communications modem, an infrared ray module or an antenna. The input section 116 is the operation section which constitutes a keyboard, or a touch panel or a pointing device, such as a mouse or a touch type pen and through which character data and various commands are input.

The display device 117 is a liquid crystal display or a CRT which provides full-color display, or a plasma display device. The printing section 118 is a nonimpact printer, such as a thermal transfer or ink-jet type, or a dot-impact printer.

The card reader/writer 4 performs a writing/reading operation on the CF card 3.

The operations of the server 1 and the portable terminal 2 according to the third embodiment will now be described with reference to the flowcharts shown in FIGS. 14 to 16.

It is to be noted that the program that accomplishes various functions described in those flowcharts is stored in the recording medium 113 in the form of computer-readable program codes according to which the CPU 11 executes the operations as needed. The same is true of other embodiments which will be discussed later.

Figure 14:
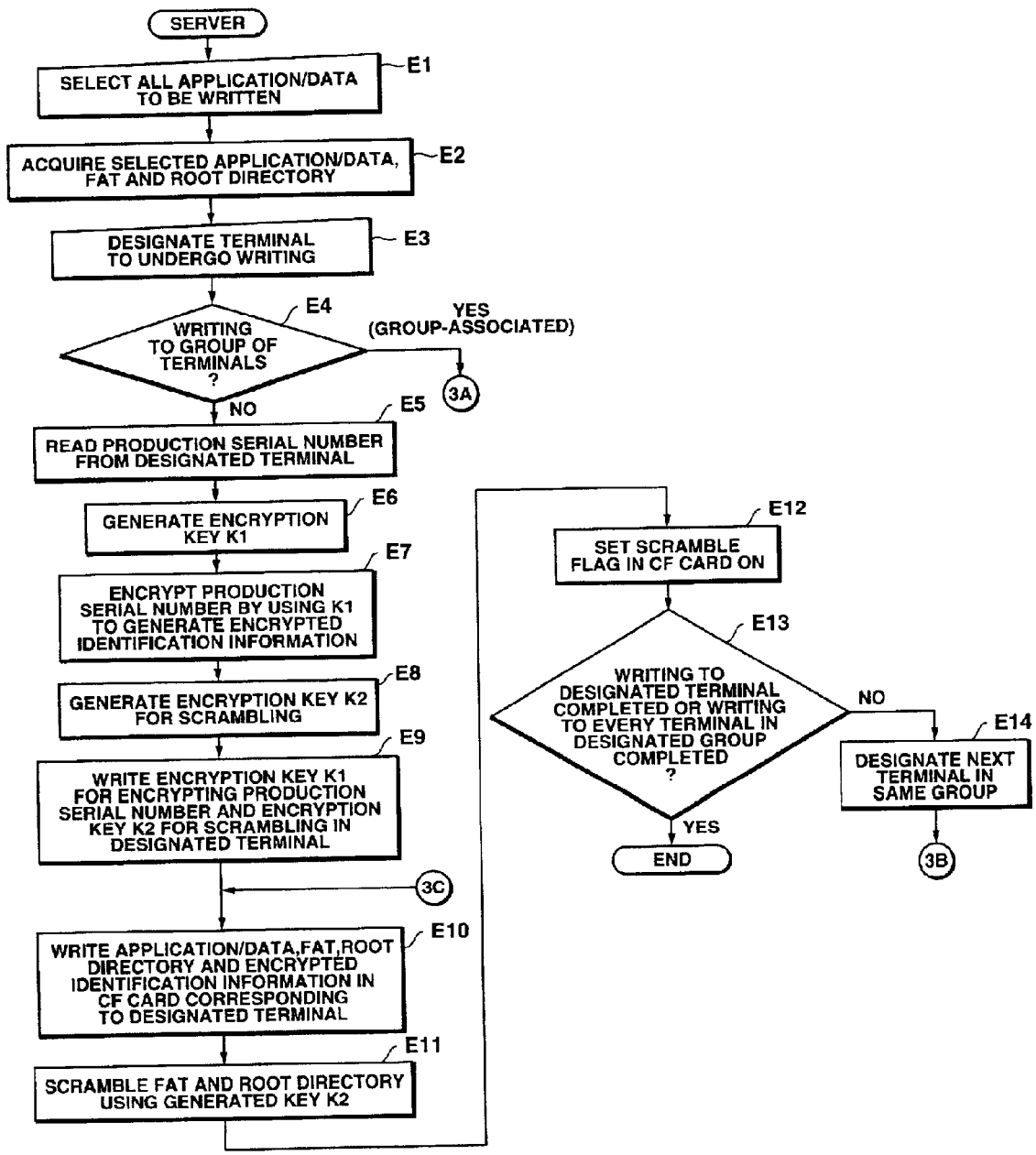
FIG. 14 is a flowchart illustrating the operation of the server 1 when the portable terminal 2 is externally provided with an application (AP) software/database, which is stored and managed on the server 1, by means of the portable CF card 3.
Figure 15:
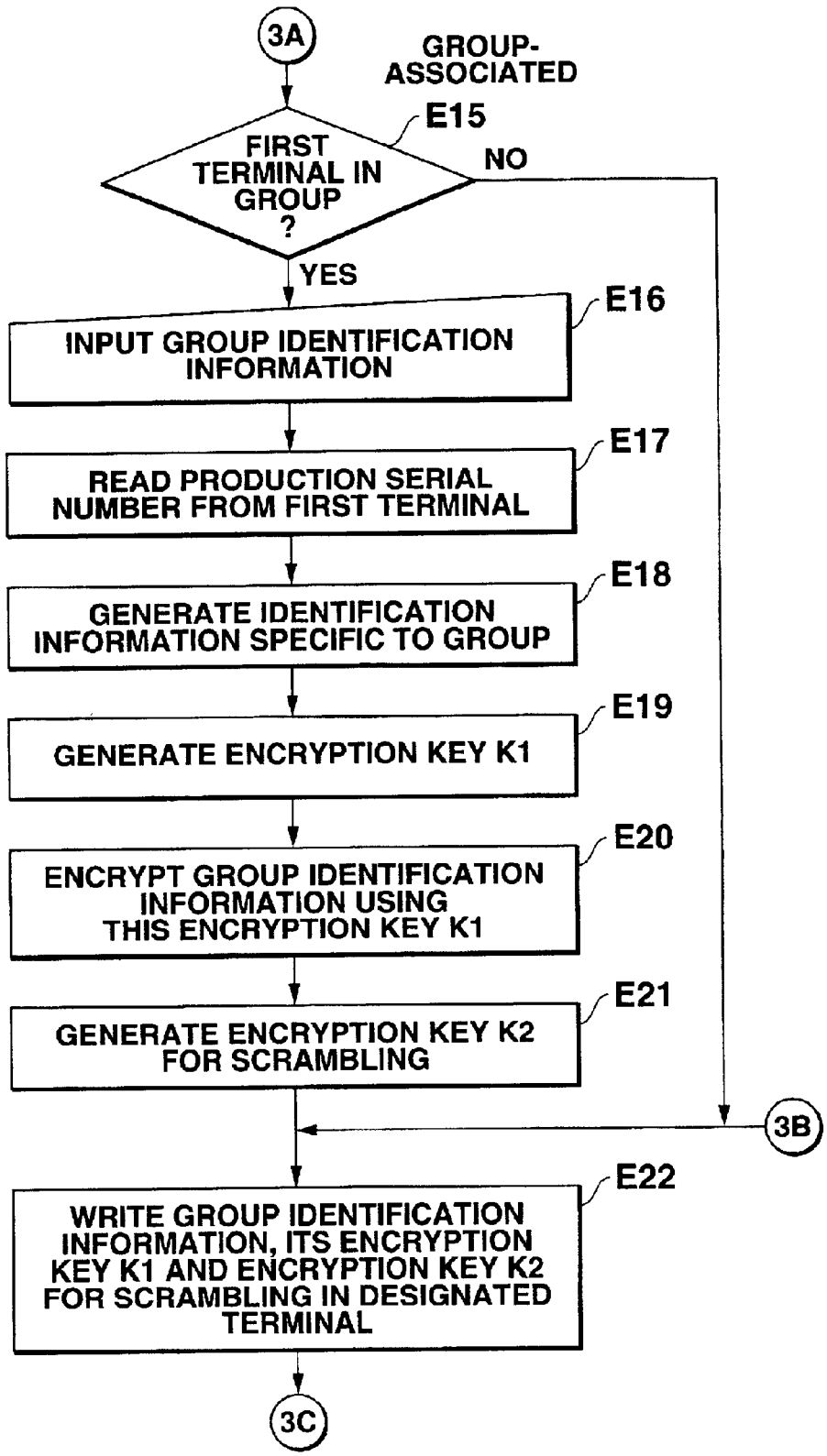
FIG. 15 is a flowchart which is a continuation of FIG. 14 and illustrates the operation of the server 1.

FIGS. 14 and 15 are flowcharts illustrating the operation of the server 1 when the portable terminal 2 is externally provided with AP software/data, which is stored and managed on the server 1, by means of the portable CF card 3.

First, when the user selects all the AP software/data to be written (step E1), the CPU 11 acquires the AP software/data selectively designated and the FAT and root directory from the AP software/database storage section 106 (step E2).

When the user designates the terminal on which writing is to be performed (step E3), the CPU 11 checks if writing is to be performed only on the designated terminal or a group of terminals (step E4).

When writing only to the designated terminal is specified, the "production serial number" is read from the designated terminal (step E5) and an encryption key K1 for encrypting the "production serial number" is generated (step E6).

In this case, the encryption key K1 is numerical data or the like which is generated at random and is used in encrypting the "production serial number" read from the designated terminal, thereby generating terminal identification information (step E7).

Then, the CPU 11 generates an encryption key K2 for a scrambling process (step E8), which is also numerical data or the like which is generated at random. The encryption key K1 for encrypting the terminal identification information and the encryption key K2 for scrambling, which are generated in this manner, are written in the designated terminal (step E9).

The CPU 11 writes the AP software/data, FAT and root directory acquired in step E2 and the terminal identification information encrypted in step E7 into the CF card 3 that is associated with the designated terminal (step E10).

Then, the CPU 11 scrambles the AP software/data, FAT and root directory, written in the CF card 3, using the encryption key K2 generated in step E8 (step E11) and sets the "scramble flag" in the CF card 3 on (step E12).

When processing with respect to the designated terminal is completed, such is detected in step E13 and this flow is terminated.

When writing to a group of terminals is designated (step E4), the flow proceeds to the flowchart in FIG. 15 and a process of generating group terminal identification information is carried out first.

As described above, the group terminal identification information is generated by the combination of the predetermined terminal identification information (production serial number) read from the first portable terminal 2 belonging to that group and an arbitrary input group name. If it is the first terminal in the group (step E15), as its group identification information (group name) is arbitrarily input (step E16), the terminal identification information (production serial number) is read from the first terminal (step E17). Based on the group name and the group name and production serial number, the group terminal identification information predetermined to the group is generated (step E18).

If the group name is "business section 1" and the production serial number is "C0001", for example, "C0001 business section 1" is generated as the group terminal identification information.

Then, an encryption key K1 for encrypting this group terminal identification information is generated at random (step E19) and the group terminal identification information is encrypted using the generated key K1 (step E20).

Further, an encryption key K2 for scrambling is generated (step E21).

Next, the encrypted group terminal identification information is written together with its encryption key K1 and the encryption key K2 for scrambling in the designated terminal, i.e., the first portable terminal 2 in this case, (step E22).

The flow returns to step E10 in FIG. 14 to write the AP software/data, its the FAT and root directory, and the encrypted group terminal identification information in the CF card 3 associated with the designated terminal. Then, the FAT and root directory are scrambled by using the encryption key K2 for scrambling (step E11) and the scramble flag is set on (step E12).

The above writing process is carried out for all the terminals in the group. Specifically, it is checked in step E13 if every terminal in the designated group has undergone the writing process. If the processing has not completed, the flow proceeds to step E14 to designate the next terminal in the same group. The flow then goes to step E22 in FIG. 15 to write the group terminal identification information together with its encryption key K1 and the encryption key K2 for scrambling in the designated terminal or the second portable terminal 2 in this case.

Thereafter, the above-described operation is repeated until every terminal in the designated group undergoes the writing process. When the writing process is completed for every terminal in the designated group, the same contents are written in the individual portable terminals 2 in the same group and the same group terminal identification information is written in the individual portable terminals 2 in the group and the associated CF cards 3.

Figure 16:
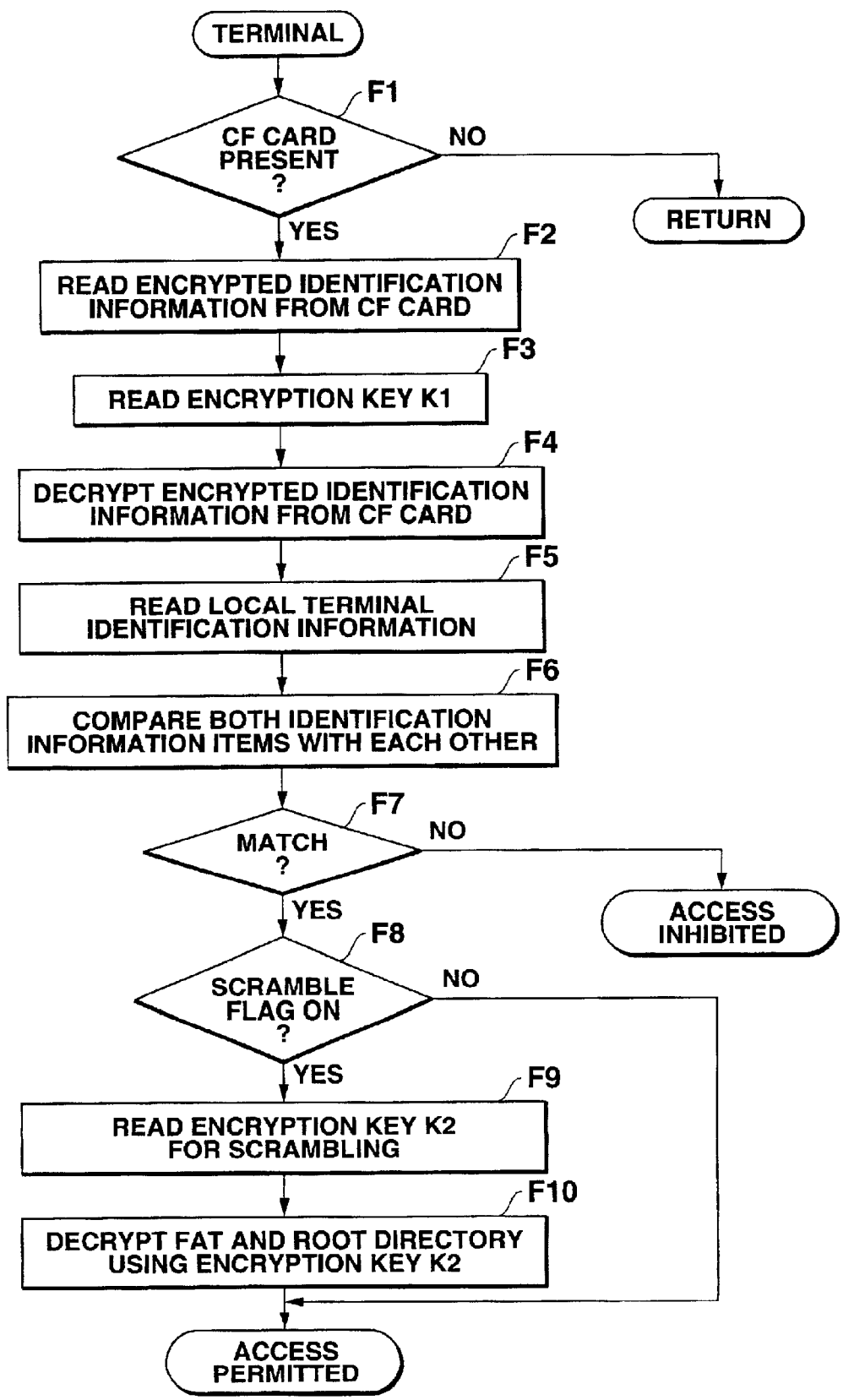
FIG. 16 is a flowchart illustrating the operation of each portable terminal 2 which is initiated when access to the CF card 3 is designated.

FIG. 16 is a flowchart illustrating the operation of each portable terminal 2. When access to a CF card 3 is specified, the operation according to this flowchart is initiated.

First, the CPU 11 checks if the CF card 3 is set (step F1). If the CF card 3 is not set, the CPU 11 returns to the main flow in the normal routine. If the CF card 3 is set, the CPU 11 reads the terminal identification information from the CF card 3 (step F2) and reads from the server 1 the encryption key K1 for the terminal identification information written in the local terminal (step F3). Then, the CPU 11 decrypts this terminal identification information using the encryption key K1 (step F4).

Then, the CPU 11 reads the local terminal identification information previously set (step F5), compares it with the decrypted terminal identification information (step F6) and checks if both information match with each other (step F7).

When there is no match, the access to the designated CF card 3 is inhibited and the routine is terminated. When there is a match, on the other hand, the CPU 11 checks if the scramble flag in the CF card 3 is set on (step F8).

When the scramble flag is not set on, the CPU 11 permits access to the CF card 3 only on the condition that both terminal identification information coincide with each other. When the scramble flag is set on, however, the CPU 11 reads from the server 1 the encryption key K2 for scrambling written in the local terminal (step F9) and decrypts the FAT and root directory in the CF card 3 using this encryption key K2 (step F10). This permits access to the CF card 3.

According to the third embodiment, as described above, the server 1 reads predetermined terminal identification information from a portable terminal 2 connected thereto, writes the read, predetermined terminal identification information, AP software/data and its FAT and root directory in the associated CF card 3, and scrambles and the FAT and root directory in the CF card 3 to encrypt them.

At the time of accessing the AP software/data in the CF card 3 set in the portable terminal 2, the portable terminal 2 reads the encrypted terminal identification information from the CF card 3, restores it and compares the restored terminal identification information with its own terminal identification information. When there is a match, the portable terminal 2 descrambles the scrambled the FAT and root directory of the AP software/data and only then can permit access to the CF card 3.

That is, as the association of a CF card 3 with a portable terminal 2 is carried out by checking whether or not their terminal identification information coincide with each other and encryption and decryption of the FAT and root directory of the AP software/data, only a predetermined terminal is permitted to access the AP software/data in the CF card 3 and the terminal-by-terminal access control can effectively inhibit illegitimate copying by another portable terminal device which does not have an authentic accessing right in the case where the portable terminal 2 is externally provided with the AP software/data, which is managed by the server 1, by means of the portable CF card 3. In this case, the encryption of the terminal identification information and the FAT and root directory of the AP software/data enhances the security significantly.

The same is true of a group-associated CF card as well as a terminal-associated CF card. When predetermined AP software/data is used for each business area, area-by-area access control is possible if the terminal groups are separated area by area.

Additional advantages and modifications will readily occur to those skilled in the art. Therefore, the invention in its broader aspects is not limited to the predetermined details and representative embodiments shown and described herein. Accordingly, various modifications may be made without departing from the spirit or scope of the general inventive concept as defined by the appended claims and their equivalents.

What is claimed is:

1. A system comprising a database distribution apparatus configured to write various types of databases in a portable recording medium and a portable terminal apparatus configured to execute data processing by accessing a database written in the recording medium while the recording medium is set in the terminal apparatus, the database distribution apparatus comprising:

database storing means for storing a plurality of databases;

identification information memory means for storing identification information corresponding to terminal identification information pre-stored in the portable terminal apparatus while associating the information to a plurality of portable terminal apparatus, respectively and grouping the identification information into a plurality of groups; and distribution means for, when writing a database to a plurality of recording mediums to which the databases are distributed, reading the identification information contained in a group selected from a plurality of groups, from the identification information memory means, reading a database stored in the database storing means to be utilized in a portable terminal device of the selected group, and writing the read identification information and databases consecutively to said plurality of recording mediums set in the portable terminal apparatus, and the portable terminal apparatus comprising:

judging means for, when accessing the database, reading the identification information written in the recording medium set in the portable terminal apparatus and judging whether the portable terminal apparatus contains identification information corresponding to terminal identification information pre-stored in the portable terminal apparatus itself; and processing means for executing an accessing process to the database written in the memory medium when the judgment means judges that the corresponding identification information is contained.

2. The system according to claim 1, wherein the database distribution apparatus further comprises:

correspondence storing means for storing correspondence between the databases and the identification information, respectively, the distribution means further comprising means for specifying the databases corresponding to the read identification information based on the correspondence storing means, reading the specified databases consecutively from the database storing means, and writing the read databases, while associating them with the identification information, consecutively to said plurality of recording mediums set in the portable terminal apparatus; and the portable terminal apparatus comprising means for executing the accessing process by the processing means only to a database corresponding to the identification information judged to be contained by the processing means.

3. A database distribution apparatus that writes various databases to a portable recording medium comprising:

database storing means for storing a plurality of databases;

identification information memory means for storing identification information corresponding to terminal identification information pre-stored in a portable terminal apparatus while associating the identification information to a plurality of portable terminal apparatus, respectively, and grouping the identification information into a plurality of groups;

correspondence storing means for storing correspondence between the databases and the identification information, respectively, individual designation means for designating an individual write of a database in a one-to-one correspondence manner in which only one portable terminal apparatus is allowed to be used;

group designation means for designating a group write of a database that can be utilized commonly by a plurality of portable terminal apparatus within the group;

first distribution means for, when writing a database to a recording medium to which the database is distributed by the individual designation, reading the identification information corresponding to the portable terminal apparatus in which the recording medium is used, from the identification information memory means, specifying the database corresponding to the read identification information, reading the specified database from the database storing means, and writing the read identification information and databases to the recording medium; and second distribution means for, when writing a database to a plurality of recording mediums to which the database is distributed by the group designation, reading the identification information corresponding to a plurality of portable terminal apparatus contained in the group that uses the recording medium, from the identification information memory means, reading a database to be utilized by said plurality of portable terminal apparatus of the group, and writing the read identification information and database to the recording medium.

4. A database distributing method comprising:

distributing varius types of databases to a recording medium;

accessing a database written in the recording medium while the recording medium is set in a portable terminal apparatus;

wherein the step of distributing comprises:

storing a plurality of databases, storing identification information corresponding to terminal identification information pre-stored in the portable terminal apparatus while associating the identification information to a plurality of portable terminal apparatus, respectively;

grouping the identification information into a plurality of groups;

reading, when writing a database to a plurality of recording mediums to which the databases are distributed, the identification information contained in a group selected from said plurality of groups;

reading a database to be utilized in a portable terminal device of the selected group; and writing the read identification information and databases consecutively to a plurality of recording mediums set in the portable terminal apparatus, and the accessing the database comprises:

reading, when accessing the database, the identification information written in the recording medium set in the portable terminal apparatus, judging whether the portable terminal apparatus contains identification information corresponding to terminal identification information pre-stored in the portable terminal apparatus itself; and accessing to the database written in the memory medium when the judging judges that the corresponding identification information is contained.

5. A database distributing method for distributing various databases to a portable recording medium, comprising:

storing a plurality of databases, storing identification information corresponding to terminal identification information pre-stored in a portable terminal apparatus while associating the identification information to a plurality of portable terminal apparatus, respectively;

grouping the identification information into a plurality of groups;

storing correspondence between the databases and the identification information, respectively;

designating an individual write of a database in a one-to-one correspondence manner in which only one portable terminal apparatus is allowed to be used;

designating a group write of a database that can be utilized commonly by a plurality of portable terminal apparatus within the group, first distributing, when writing a database to a recording medium to which the database is distributed by the individual designation, by reading the identification information corresponding to the portable terminal apparatus in which the recording medium is used, from identification information memory means; specifying the database corresponding to the read identification information, reading the specified database from the database Storing means, and writing the read identification information and databases to the recording medium; and second distributing, when writing a database to a plurality of recording mediums to which the database is distributed by the group designation, by reading the identification information corresponding to a plurality of portable terminal apparatus contained in the group that uses the recording medium, from the identification information memory means, reading a database to be utilized by said plurality of portable terminal apparatus of the group, and writing the read identification information ard database to the recording medium.

* * * * *